Nov. 29, 1949
R. E. BOYDEN
2,489,696
VIBRATION ABSORBING MEANS FOR
BUSINESS MACHINES OR THE LIKE
Filed Sept. 24, 1946
2 Sheets-Sheet 1
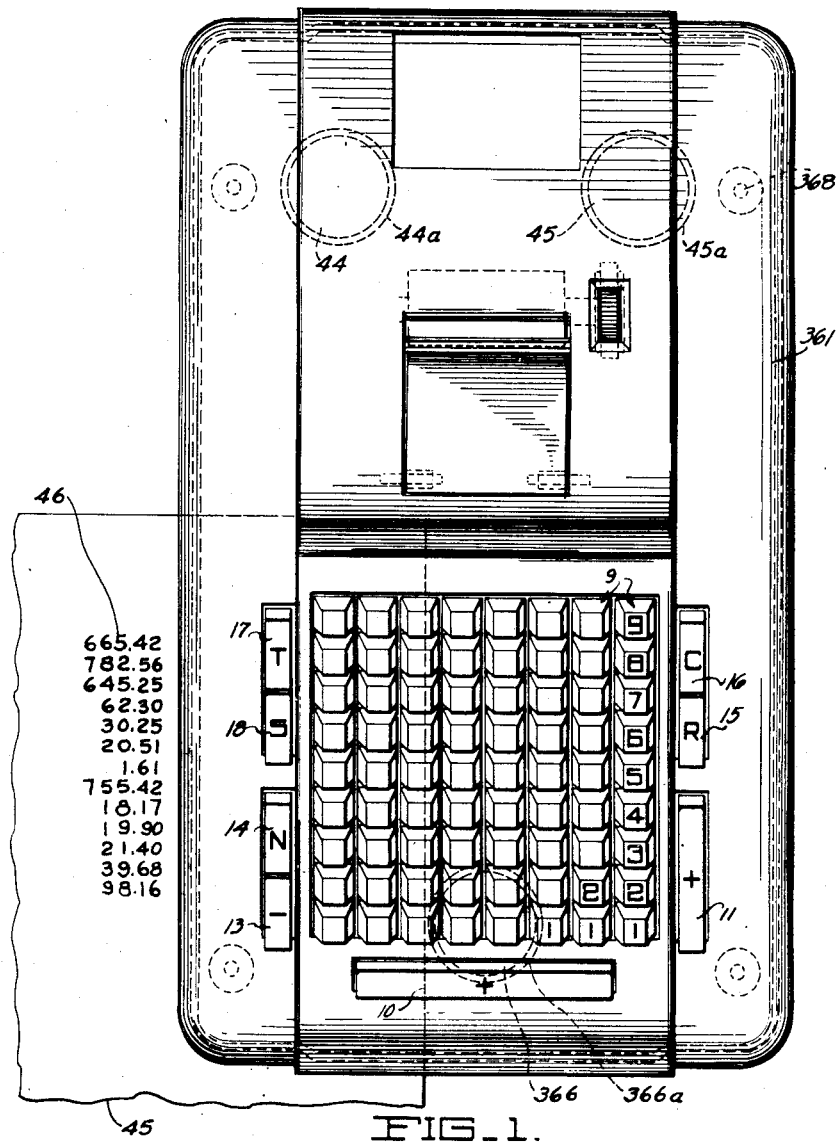
FIG_1.
INVENTOR.
ROBERT E. BOYDEN
BY
Fred N. Schwend
ATTORNEY

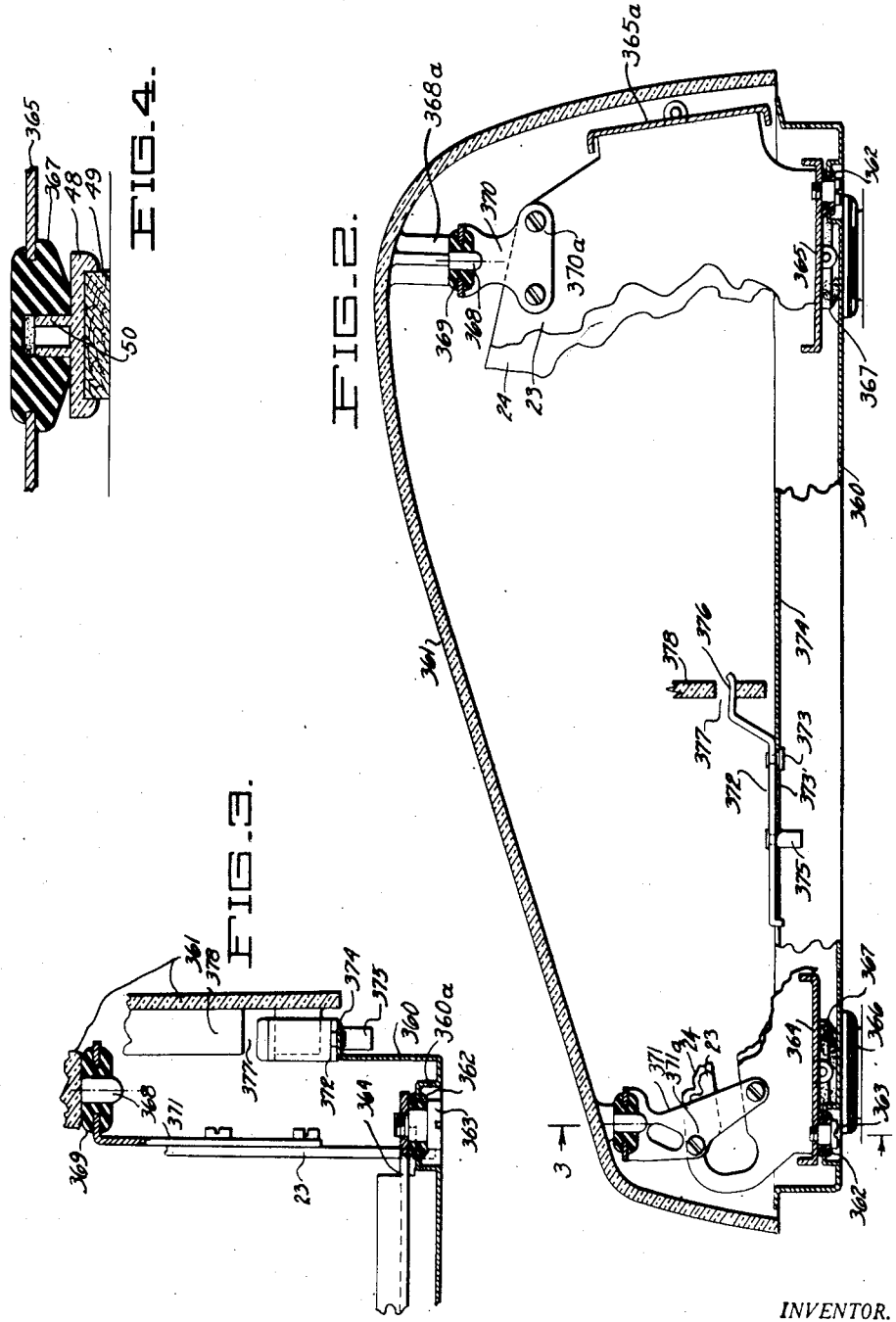

Patented Nov. 29, 1949

2,489,696

UNITED STATES PATENT OFFICE 2,489,696

VIBRATION ABSORBING MEANS FOR BUSINESS MACHINES OR THE LIKE

Robert E. Boyden, Los Angeles, Calif., assignor to Clary Multiplier Corporation, Los Angeles, Calif., a corporation of California Application September 24, 1946, Serial No. 699,039

6 Claims. (Cl. 45—68.1)

This invention relates to business machines and has particular reference to means for reducing emanation of sound and other vibrations therefrom.

In business machines such as adding, calculating, check writing, and typewriting machines, etc., the operating mechanism therefor generally comprises a considerable number of independently operable parts which regardless of how well designed, emit a considerable amount of noise and mechanical vibration through both the casing thereof as well as through the supporting means therefor. This is especially true in motor operated machines. Such machines are generally used in offices or in surroundings in which a number of people are working together and when used to any considerable extent tend to cause distraction and to reduce the efficiency of both the operator and those near him.

Accordingly, a principal object of the present invention is to reduce the amount of noise and mechanical vibrations emanating from a machine of the above type.

Another object of the invention is to provide a casing in which all fastening devices for holding the different parts of the casing together and in place on the machine are concealed from view when the machine is in operating position.

Another object of the invention is to provide a casing for a machine of the above type which may be readily removable to permit access to the interior of the machine.

Another object of the invention is to provide a removable casing for a machine of the above type which incorporates a minimum number of parts, is inexpensive to manufacture, and yet which reduces transmission of vibration.

A still further object is to provide a novel form of vibration absorbing support for machines of the above type.

The present invention is particularly adapted for use in connection with a key controlled adding machine such as is disclosed and claimed in the copending application of Robert E. Boyden, Serial No. 582,553, filed March 13, 1945, and titled "Calculating machine." The present application is a continuation in part of said copending application and reference is hereby made thereto for an understanding of the details of the machine which are not specifically disclosed herein. However, it is to be understood that the invention may be equally well applied to the other types of adding machines or to other types of business machines.

The manner in which the above and other objects of the invention are accomplished will be readily understood on reference to the following specification when read in conjunction with the accompanying drawings, wherein:

Fig. 1 is a plan view of an adding machine embodying a preferred form of the invention.

Fig. 2 is a longitudinally sectional view illustrating the means for mounting the machine covers on the machine.

Fig. 3 is a transverse sectional view taken along the line 3—3 of Fig. 2.

Fig. 4 is a sectional view through one of the supporting feet of the machine.

Referring to the drawings, the details of the adding machine mechanism are omitted therein for the sake of brevity and clarity since such details are believed unnecessary for an understanding of the present invention. However, it should be noted that the machine mechanism is mounted on a machine frame comprising spaced vertical side frames 23 and 24, portions of which are broken away in Fig. 2. These frames extend longitudinally of the machine on either side thereof and are suitably and rigidly held in spaced relation to each other by cross beams 364, 365 and 365a shaped in the form of channels.

Included in the machine are eight rows of depressible amount keys 9 (Fig. 1) upon which an amount to be entered into the machine is set. These keys are supported by a key frame (not shown) suitably secured between the machine frame plates 23 and 24. Also supported on the key frame are depressible control bars 10, 11, and 13 to 18, inclusive. The purpose of the latter bar is to initiate and determine the different operational functions of the machine, such as addition, subtraction, totaling, etc.

The housing for the machine includes a base cover or housing part 360 extending under the machine frame and an upper cover or housing part 361, both covers being completely insulated by soft rubber or other suitable vibration insulating material from the frame so as to reduce the transmission of sound and other vibrations to the exterior of the machine.

The base cover 360 is preferably formed of sheet metal and has a series of upwardly extending wells 360a terminating in openings in which are fixedly mounted annular grommets 362, preferably of rubber.

The upper cover 361, preferably of plastic material, is provided with a series of four pins 368 located adjacent the four corners of the machine and extending downwardly from bosses 368a integral with the cover. When the cover is fitted on the machine the pins 368 extend into grommets 369 fixedly mounted on brackets 370 and 371 secured to the machine's side frames 23 and 24 by screws 370a and 371a.

Thus, it will be seen that the grommets 369 resiliently support the cover 361 on the frame and at the same time locate the cover in proper alignment relative to both the machine and the base cover 360.

The cover 361 is removably attached to the base cover 360 by a pair of lock members 372 on opposite sides of the machine. Each of these members is slidably attached by means of a guide stud 373 to a flange 374 extending horizontally from the base cover, the stud being slidable along an elongated slot 373' formed in the flange. The lock member is provided with a knob 375 extending downwardly through a second elongated slot in the flange to permit manual adjustment of the lock to and from its locking position illustrated in Fig. 2. The lock member has an elevated rear section 376 adapted to be inserted in a slot 377 formed in a rib 378 (see also Fig. 3) integrally formed with the cover 361. When the lock is adjusted rearwardly the section 376 moves over the surface forming the bottom of the slot 377 to press the cover downwardly upon the rubber grommets 369 and retain the same in place.

When it is desired to remove the cover 361 from the machine the lock members are slid forward and the cover may then be easily removed by withdrawing the same vertically to remove the pins 368 from the grommets 369.

It will be seen that the above mentioned construction results in a casing which has a minimum number of parts, will permit considerable tolerance in dimensions, and does not display screws or other fastening devices when the machine is in a normal operating position.

Three machine supporting feet 44, 45, and 366 are provided to support the machine. Two of the feet 44 and 45 are located at the rear of the machine and are spaced apart as indicated. These feet extend through openings 44a and 45a, respectively, in the base cover while the third foot 366 is located in the center of the machine adjacent its forward end and extends through an opening 366a in the base cover. The two rearmost feet support the crossbar 365 by sections 367 of rubber or other vibration absorbing material while the forward foot 366 supports the forward crossbar 364 through a similar rubber section. It will be noted that none of the three feet contact the base cover 360. Thus, there is no tendency for sound or mechanical vibration to be transmitted between the various feet and the base cover.

The provision of three spaced feet to support the machine enables the machine to be firmly set on a desk or other supporting surface even though the surface is uneven or any one leg is placed upon papers, blotters or other objects.

Since the weight of the machine is substantially equally apportioned to the three feet, a like equal distribution of vibration is also apportioned to the three feet and thus no one of the latter will receive a concentration of vibratory forces which may exceed the vibration absorbing quality of the material comprising the feet.

A further and very important advantage of the provision of three supporting feet is that a paper, ledger sheet or the like may be slipped under the machine an appreciable distance. Thus, a paper as indicated at 45 (Fig. 1) including a list of items 46 may be slipped under the machine until the items thereon lie directly adjacent the side of the machine. Now, the operator may, with a minimum shifting of his glance, read the items and then set the same on the amount keys 9. With such minimum shifting of the operator's eyes from the record material to the amount keys, the tendency to err in transposing the values of the various items onto the amount keys is correspondingly reduced.

Referring to Fig. 4, each of the supporting feet comprises the aforesaid section 367 of rubber having a circumferential groove therearound into which is fitted a circular apertured section of the cross beam 365. The lower portion of the section 367 tapers inwardly at an acute angle, forming a frusto-conical section, the lower edge of which rests on the upper shoulder of a foot member 48. The latter has a shank 50 which is slipped snugly within a central bore in the rubber section. The lower portion of the member 48 is cup shaped to receive a felt disc 49 which contacts the supporting surface.

It will be noted that the outer diameter of the foot member 48 is of larger diameter than the diameter of the aperture in the beam 365 into which the rubber section 367 is fitted. Under normal load conditions the diameter of the portion of the rubber section 367 contacting the upper shoulder of the member 48 is smaller than the aperture in the cross beam and consequently the rubber is placed under a shearing stress which brings out the best vibration absorbing characteristics of the rubber. However, upon an overloading of the machine as might result on pressing downward thereon an abnormal amount the lower portion of the rubber section will flatten out, contacting the entire surface of the upper shoulder of member 48. Therefore, a portion of the rubber will be placed under a compressive stress which will more adequately resist deformation of the body of rubber and thus prevent an abnormal distension of the rubber body.

It should be further noted that the arrangement of the two dissimilar vibration absorbing materials, with their different vibration absorbing characteristics, being placed in series between the supporting surface and the vibratory machine, results in a superior vibration absorbing or damping unit.

Although I have described my invention in detail and have therefore used certain specific terms and languages herein, it is to be understood that the present disclosure is illustrative, rather than restrictive, and that changes and modifications may be made without departing from the spirit or scope of the invention as set forth in the claims appended hereto.

Having thus described the invention, what I desire to secure by United States Letters Patent is:

1. In a business machine including: a machine frame, a housing comprising separate housing parts substantially enclosing said frame, vibration absorbing means independently supporting the respective housing parts on said frame for reducing the transmission of vibration from said frame to said housing parts, said housing parts reducing emanation of machine operating noises therefrom when said machine is in operation, and means detachably securing said housing parts together.

2. In a business machine including: a machine frame, a first housing part enclosing the upper portion of said machine including a portion of said frame, means comprising vibration absorbing material supporting said first housing part on said frame, a second housing part enclosing the lower portion of said machine and the remaining portion of said frame, means comprising vibration absorbing material supporting said second housing part on said frame, said housing parts jointly substantially enclosing said machine, said vibration absorbing material reducing transmission of vibration from said frame to said housing parts and said housing parts reducing emanation of machine operating noises therefrom when said machine is in operation, and means detachably securing said housing parts together.

3. In a business machine including: a machine frame, a first housing part enclosing the upper portion of said machine including a portion of said frame, means comprising vibration absorbing material supporting said first housing part on said frame, a second housing part enclosing the lower portion of said machine and the remaining portion of said frame, means comprising vibration absorbing material supporting said second housing part on said frame, said housing parts jointly substantially enclosing said machine, said vibration absorbing material reducing the transmission of vibration from said frane to said housing parts and said housing parts reducing emanation of machine noises therefrom when said machine is in operation, means detachably securing said housing parts together, and means independent of said housing parts for supporting said frame.

4. In a business machine including: a machine frame, and manually operable instrumentalities carried thereby for controlling said machine; a first housing part enclosing the upper portion of said machine including a portion of said frame, a second housing part enclosing the lower portion of said machine including the remaining portion of said frame, means comprising vibration absorbing material for independently supporting the respective housing parts on said frame for reducing transmission of vibration from said frame to said housing parts, said housing parts reducing emanation of machine operating noises therefrom when said machine is in operation, one of said housing parts having an opening therein to permit manipulation of said instrumentalities while said housing parts are in enclosing positions, and means for detachably securing said housing parts together.

5. In a business machine including: a machine frame, a first housing part enclosing the upper portion of said machine including a portion of said frame, means comprising yieldable vibration absorbing material supporting and locating said first housing part on said frame, a second housing part enclosing the lower portion of said machine including the remaining portion of said frame, means comprising yieldable vibration absorbing material supporting and locating said second housing part on said frame, and an attaching device movably mounted on one of said housing parts and engageable with the other of said housing parts to draw said housing parts toward each other.

6. In a business machine including: a machine frame, a first housing part enclosing the upper portion of said machine including a portion of said frame and having a downwardly extending wall, means comprising yieldable vibration absorbing material supporting and locating said first housing part on said frame, a second housing part enclosing the lower portion of said machine including the remaining portion of said frame and having an upwardly extending wall locating inwardly of said downwardly extending wall, means comprising yieldable vibration absorbing material supporting and locating said second housing part on said frame, a projection extending inwardly from said downwardly extending wall, and an attaching device adjustably carried by said second housing part, said attaching device having a manipulatable portion extending exteriorly of said upwardly extending wall and having a latching portion arranged to latch over said inwardly extending projection.

ROBERT E. BOYDEN.

REFERENCES CITED

The following references are of record in the file of this patent:

UNITED STATES PATENTS

| Number | Name | Date |
|---|---|---|
| 1,830,058 | Helmond | Nov. 3, 1931 |
| 1,858,778 | Horton | May 17, 1932 |
| 2,140,135 | Landsiedel | Dec. 13, 1938 |

FOREIGN PATENTS

| Number | Country | Date |
|---|---|---|
| 453,319 | Great Britain | Sept. 9, 1936 |